T. H. LEONARD.
DRAFT ATTACHMENT FOR VEHICLE THILLS.
APPLICATION FILED JULY 17, 1907.
900,178.
Patented Oct. 6, 1908.
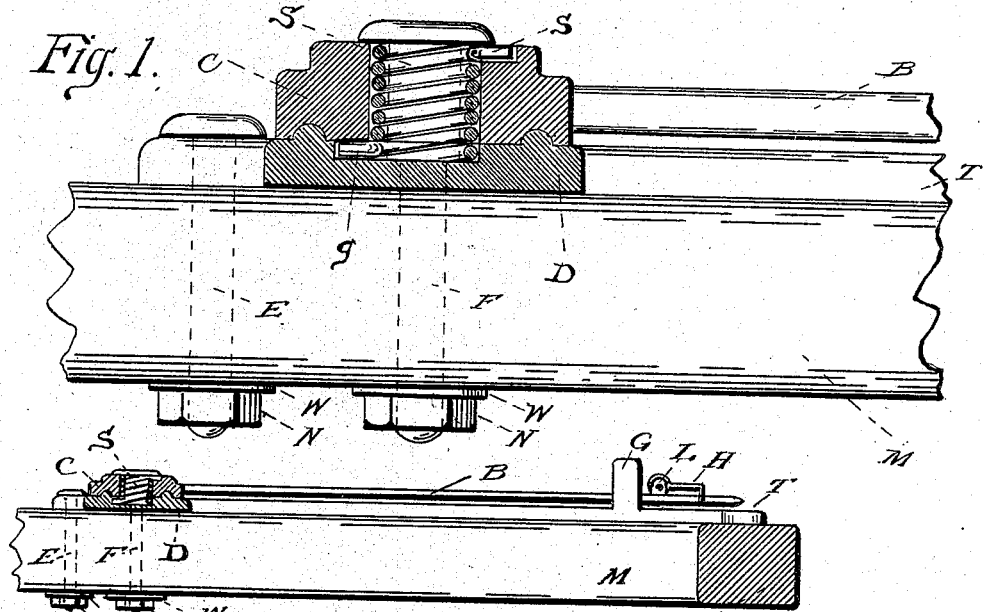
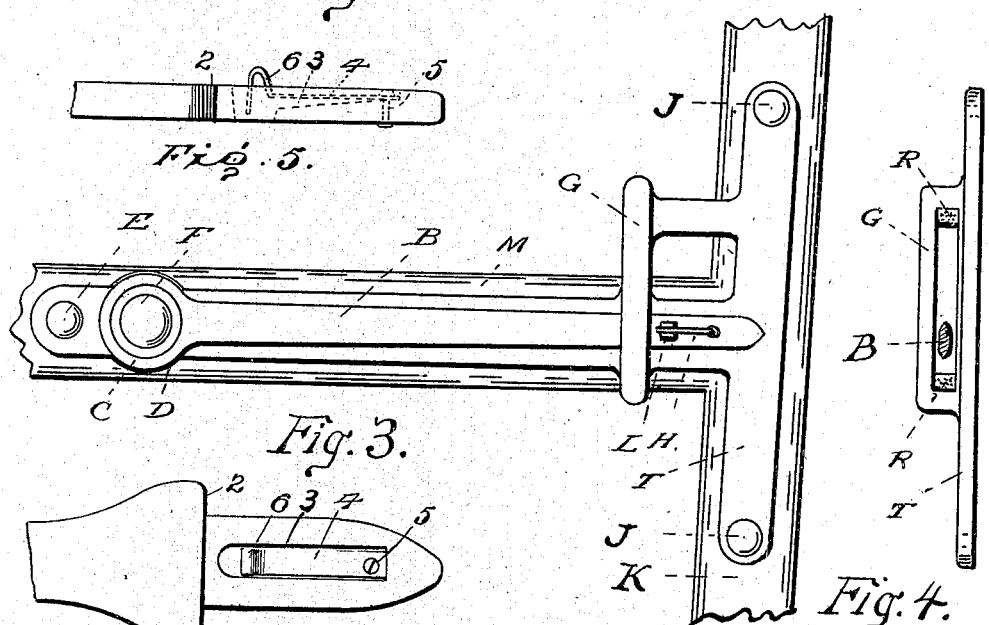

UNITED STATES PATENT OFFICE.

THORNTON H. LEONARD, OF PIQUA, OHIO.

DRAFT ATTACHMENT FOR VEHICLE-THILLS.

No. 900,178.   Specification of Letters Patent.   Patented Oct. 6, 1908.

Application filed July 17, 1907. Serial No. 384,265.

*To all whom it may concern:*

Be it known that I, THORNTON H. LEONARD, citizen of the United States, residing at Piqua, in the county of Miami and State of Ohio, have invented certain new and useful Improvements in Draft Attachments for Vehicle-Thills, of which the following is a specification.

This invention has for its object to dispense with the accustomed swingle-tree as applied and used in connection with thills and double-trees, the purpose being to simplify and cheapen the construction and to reduce the number of parts.

The invention is illustrated in the accompanying drawings in connection with thills or shafts, nevertheless, it is to be understood that with slight modifications it may be adapted to poles, double - trees and like places.

Referring to the accompanying drawings forming a part of the specifications: Figure 1 is a fragmentary view in elevation of a cross bar and draft arm, showing the joint in section. Fig. 2 is a view of the parts shown in Fig. 1 on a smaller scale, illustrating one of the thills or shafts in section. Fig. 3 is a top plan view of the parts shown in Fig 2. Fig. 4 is a view in elevation of the iron secured to the thills or shaft, showing the position of the draft arm. Fig. 5 is a side elevation of the outer end of a modified form of draft arm. Fig. 6 is a top plan view of the same.

Corresponding and like parts are referred to in the following description and indicated in all the views of the drawings by the same reference characters.

The letter K represents a thill or shaft and M the cross bar connecting a pair thereof. An iron T of T-form is bolted or otherwise secured to the cross bar M and thill or shaft K by fastenings E and J. A loop G is formed upon the iron T near the juncture of the cross head and stem and has a vertical and longitudinal arrangement and projects upward from the iron T and receives the outer end of the draft arm B, which latter is pivoted to the iron T at F, the latter representing a bolt or fastening similar to the fastenings E or J. The T-iron T serves to strengthen and brace the joint formed between the thill K and cross bar M.

The draft arm B has its outer end passed through the loop G and provided with a hook H and lugs L, the hook H being inserted between the lugs and pivoted thereto and serving to secure the trace or other draft connections between the collar and the part of the vehicle to which the animal is hitched. The inner pivot end of the arm B is widened and has an interlocking tongue and groove connection C with the inner portion of the iron T, thereby relieving the fastening and a coöperating spring of the strain incident to drawing the vehicle to which the animal may be hitched. A coil spring S is fitted upon the upper portion of the bolt or fastening F and is inserted in an opening formed in the widened pivot end of the draft arm B. The lower portion of said coil spring S is likewise seated in a widened portion D of the iron T so as to hold the parts in alinement. One end of the spring S is bent outward and engages with the draft arm B, whereas the opposite end is off-set, as indicated at g and engages with the iron T. The spring S holds the draft arm in a given position and in conjunction with the intermittent pulling impulses resulting from the movements of the draft animal, causes the draft arm to oscillate in substantially the same manner as the oscillatory movements imparted to a swingle or double tree. Rubber blocks R are located at opposite ends of the loop G and form buffers for the draft arm B to strike against when the same is oscillated. The several fastening bolts are provided with washers W and set nuts N.

A tug or trace may be secured to the outer end of the draft arm by means other than the hook H and lugs L, and as shown in Figs. 5 and 6, the outer end of the draft arm is reduced, forming shoulders 2 at the base of the reduced portion, the latter being formed with a slot or depression 3 in which is arranged a spring 4, which is secured at 5 to the draft arm, the inner end being bent to form a stop 6, which in conjunction with the shoulders 2 prevent displacement of the trace or tug after the latter has been slipped upon the draft arm and clears the stop 6 of the retaining spring 4.

Having thus described the invention, what is claimed as new is:

1. In a draft appliance, the combination of an iron, a swinging draft arm having one end thereof pivotally connected to the iron and provided at its opposite end with trace engaging means, the pivot end of the arm having an opening formed therein and being connected to the iron by a tongue and groove which are concentric with the opening and receive the strain upon the joint, a pivot pin projecting from the iron and passing loosely through the opening in the draft arm, a coil spring fitted loosely within the opening in the draft arm and surrounding the pivot pin and tending to swing the draft arm in one direction, and means for limiting the swinging movement of the draft arm.

2. In a draft appliance, the combination of an iron, a loop carried by the iron, a draft arm pivoted to the iron and extending through the loop, an opening being provided in the draft arm at the pivot point thereof, a tongue and groove connection between the draft arm and the iron, the said tongue and groove connection being concentric with the opening, a pivot pin connecting the iron and draft arm and passing loosely through the opening in the latter, and a coil spring surrounding the pivot pin and housed within the opening in the draft arm, opposite ends of the spring being secured respectively to the iron and draft arm.

In testimony whereof I affix my signature in presence of two witnesses.

THORNTON H. LEONARD. [L. S.]

Witnesses:
CHARLES F. BOWELLE,
ROLLIN W. REES.